(12) United States Patent
Peabody

(10) Patent No.: US 6,582,595 B1
(45) Date of Patent: Jun. 24, 2003

(54) COMPACT WATER CONDITIONING APPARATUS

(76) Inventor: Alex S. Peabody, 2031 215th La. SE., Sammamish, WA (US) 98075

( * ) Notice: Subject to any disclaimer, the term of this patent is extended or adjusted under 35 U.S.C. 154(b) by 134 days.

(21) Appl. No.: 09/675,111

(22) Filed: Sep. 28, 2000

Related U.S. Application Data

(60) Provisional application No. 60/156,371, filed on Sep. 28, 1999.

(51) Int. Cl.[7] .................................................. C02F 5/00
(52) U.S. Cl. ....................... 210/190; 210/264; 210/275; 210/283; 210/287
(58) Field of Search ................................ 210/190, 264, 210/269, 275, 283, 287

(56) References Cited

U.S. PATENT DOCUMENTS

| | | | | |
|---|---|---|---|---|
| 3,960,721 A | * | 6/1976 | Heskett | |
| 4,287,057 A | * | 9/1981 | Stanley | |
| 4,368,123 A | * | 1/1983 | Stanley | |
| 4,683,054 A | * | 7/1987 | Turnbull | |
| 4,855,043 A | * | 8/1989 | Dalton | |
| 5,227,053 A | * | 7/1993 | Brym | |
| 5,552,043 A | * | 9/1996 | Noordhoff | |
| 6,398,954 B2 | * | 6/2002 | Chau | |

* cited by examiner

Primary Examiner—Betsey Morrison Hoey
(74) Attorney, Agent, or Firm—Steven H. Arterberry, Esq.

(57) ABSTRACT

The present invention relates generally to a water conditioning apparatus that is compact and easily recharged without removal from the installation location. In one embodiment, the present invention relates to a water conditioning apparatus that is generally rectangular in shape and is configured to fit into rectangularly shaped spaces of limited size. In another embodiment, the water conditioning apparatus is configured to fit in a corner location. In still another embodiment, the water conditioning apparatus is of modular configuration and includes a self-contained selector valve system.

20 Claims, 6 Drawing Sheets

COMPACT WATER CONDITIONING APPARATUS

CROSS REFERENCE TO RELATED APPLICATION

This application claims priority to U.S. Provisional Application No. 60/156,371 filed Sep. 28, 1999.

TECHNICAL FIELD

This invention relates generally to a compact and self-contained apparatus for water conditioning. More particularly, the compact water conditioning apparatus described herein allows the installation and operation of a water conditioning device in limited spaces typically encountered in the food service industry.

BACKGROUND OF THE INVENTION

The requirement for conditioned water in the food service industry is well known. For example, conditioned water is often employed in dishwashing, in order to avoid the undesirable appearance of mineral or detergent residue. Further applications exist in beverage preparation, such as soft drinks, or in coffee preparation, in order to improve taste, and to avoid undesirable mineral deposits in dispensing machines.

Increasingly, an important conditioned water consumer in the food service industry is a food-steaming device, which is used to heat prepared food in food service establishments. When unconditioned domestic water is vaporized in these devices, they are particularly prone to fouling due to the accretion of mineral deposits in the steamer. Mineral fouling from unconditioned domestic water may result in increased energy costs in operation, and if not curtailed may eventually culminate in the complete failure of the steamer. As a result, manufacturers of food steamers frequently require that conditioned water be used in steamers, even in areas where the domestic water supply is relatively free of dissolved minerals.

Commercially available water conditioning devices are well known to those skilled in the art. Generally, prior art water conditioning devices are attached to the domestic water supply line, and allow mineral laden domestic water to flow through a bed of cation exchange resin beads to produce conditioned water. According to this method, the undesirable metallic ions present in the water, usually calcium, are exchanged for sodium ions embedded in the resin beads. When depletion of the available sodium ions in the resin beads occurs, exposing the resin beads to a sodium chloride solution, which is later discarded, recharges the unit. After recharging, the unit is then available for another water conditioning cycle.

Water conditioning units of this type are usually connected directly to the domestic water main, causing substantial internal pressures to result. Consequently, prior art water conditioning devices have generally favored the use of a cylindrical container for the cation exchange resin beads. A significant drawback associated with the use of cylindrical containers is an inefficient use of space, thereby compromising the favorable objective of compactness. For example, U.S. Pat. No. 4,855,043 issued to Dalton ("the Dalton patent") on Aug. 8, 1989 discloses a compact water conditioning apparatus that purports to be particularly suited to applications in the food service industry. However, the Dalton patent relies on a cylindrical container for the cation exchange resin beads. Similarly, U.S. Pat. No. 3,960,721 issued to Heskett on Jun. 1, 1976 discloses a water conditioning apparatus that also relies on cylindrical containers to withstand the internal pressure.

Accordingly, in view of the increasing use of food steamers in food service establishments and commercial kitchens, conventional water conditioning devices that are housed within large cylindrical containers according to the prior art are increasingly impractical since they compete for increasingly limited amounts of floor space in the kitchen area. More favorable utilization of space in food service establishments is achievable if the water conditioning apparatus container can be made to fit in a rectangularly shaped space. Moreover, it is advantageous to have the water conditioning apparatus rechargeable by on site kitchen personnel since the unit is frequently installed in a remote location, such as behind the conditioned water consumer. Such remote locations generally preclude convenient removal and replacement of the unit with a similar unit that has been recharged off-site. U.S. Pat. No. 5,552,043 to Noordhoff issued Sep. 3, 1996, discloses a water conditioning apparatus that uses a rectangular shaped container for containment of the cation exchange resin beads, thus achieving the favorable result of compactness, but lacks the important feature of self-contained serviceability, since it fails to disclose a salt solution tank and the necessary plumbing to achieve recharging in place.

Accordingly, there is a need in the food service industry for a water-conditioning apparatus that is compact, reliable, easily recharged without removal and relatively inexpensive to manufacture.

SUMMARY OF THE INVENTION

Briefly, and in general terms, the present invention relates generally to a water conditioning apparatus that is compact and easily recharged without removal from the installation location. In one aspect, the present invention relates to a water conditioning apparatus that is generally rectangular in shape and is configured to fit into rectangularly shaped spaces of limited size. In another aspect, the water conditioning apparatus is configured to fit in a corner location. In still another aspect, the water conditioning apparatus is of modular configuration and includes a self-contained selector valve system.

Other advantages will become apparent based on the description of the invention provided below when read with reference to the drawing figures. The present invention can be best understood through the following description and accompanying drawings.

DETAILED DESCRIPTION OF THE INVENTION

The present invention is generally directed to a compact and self-contained apparatus for water conditioning. Many of the specific details of certain embodiments of the invention are set forth in the following description and in FIGS. 1 through 6 to provide a thorough understanding of such embodiments. One skilled in the art will understand, however, that the present invention may have additional embodiments, or that the present invention may have additional embodiments, or that the present invention may be practiced without several of the details described in the following description. Furthermore, for purposes of the following description, it is understood that specific dimensions and other physical characteristics related to different embodiments are not to be considered limiting unless the claims expressly state otherwise.

Figure 1:
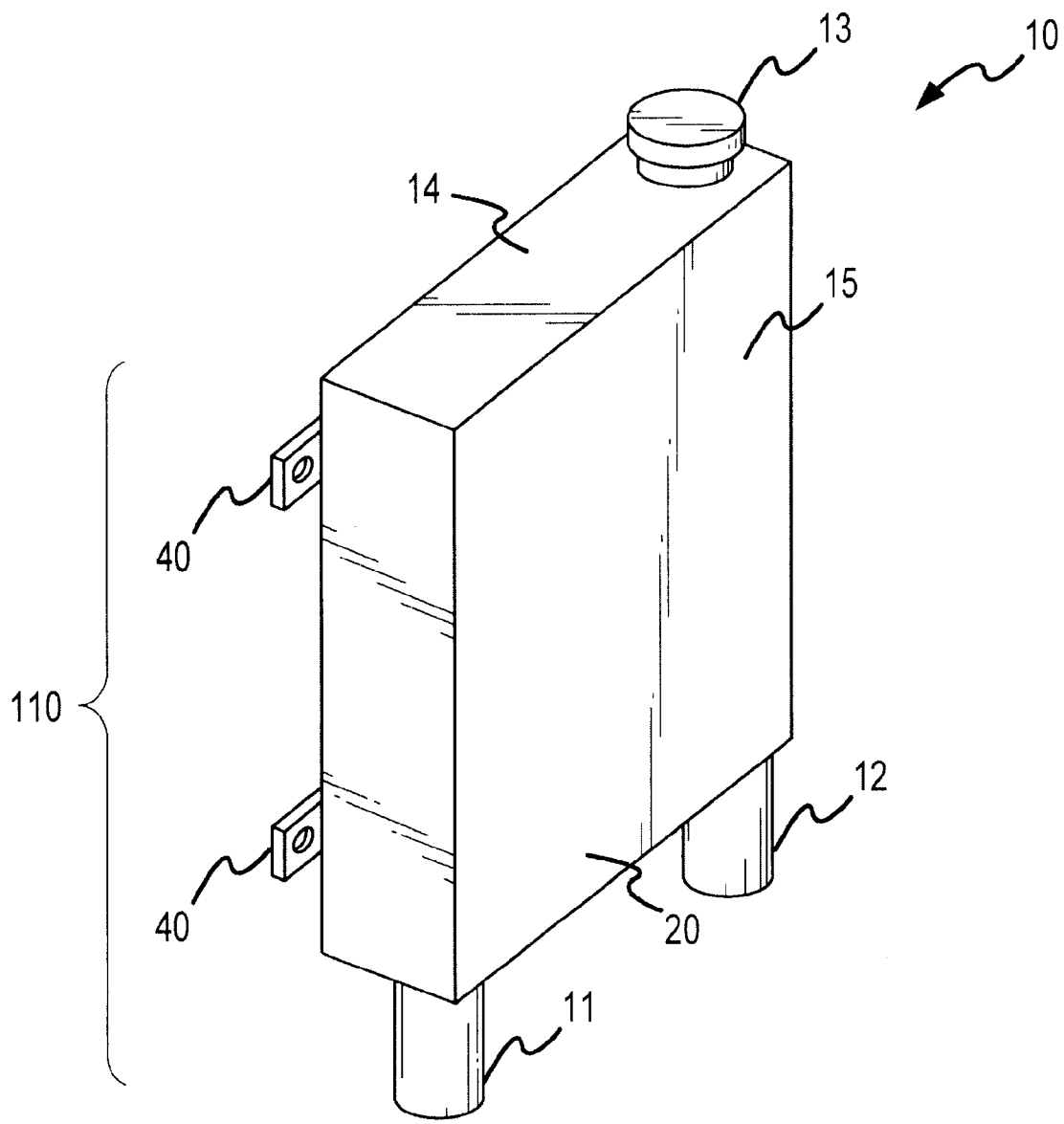
FIG. 1 is an isometric view of an embodiment of the water conditioning apparatus.

FIG. 1 illustrates a water conditioning apparatus 10 according to an embodiment of the invention. The water conditioning apparatus 10 is housed in a container 15 that is substantially rectangular in planform, and in cross section, and having an internal volume. The container 15 is further comprised of a top wall 14 having a resealable opening 13 that is fluid tight that may be removed to access the internal volume of the container 15, and a bottom wall 20 that has a fluid inlet pipe 11 and a fluid outlet pipe 12. The container 15 may optionally include a plurality of mounting lugs 40 to attach the apparatus 10 to a mounting surface 110.

Figure 2:
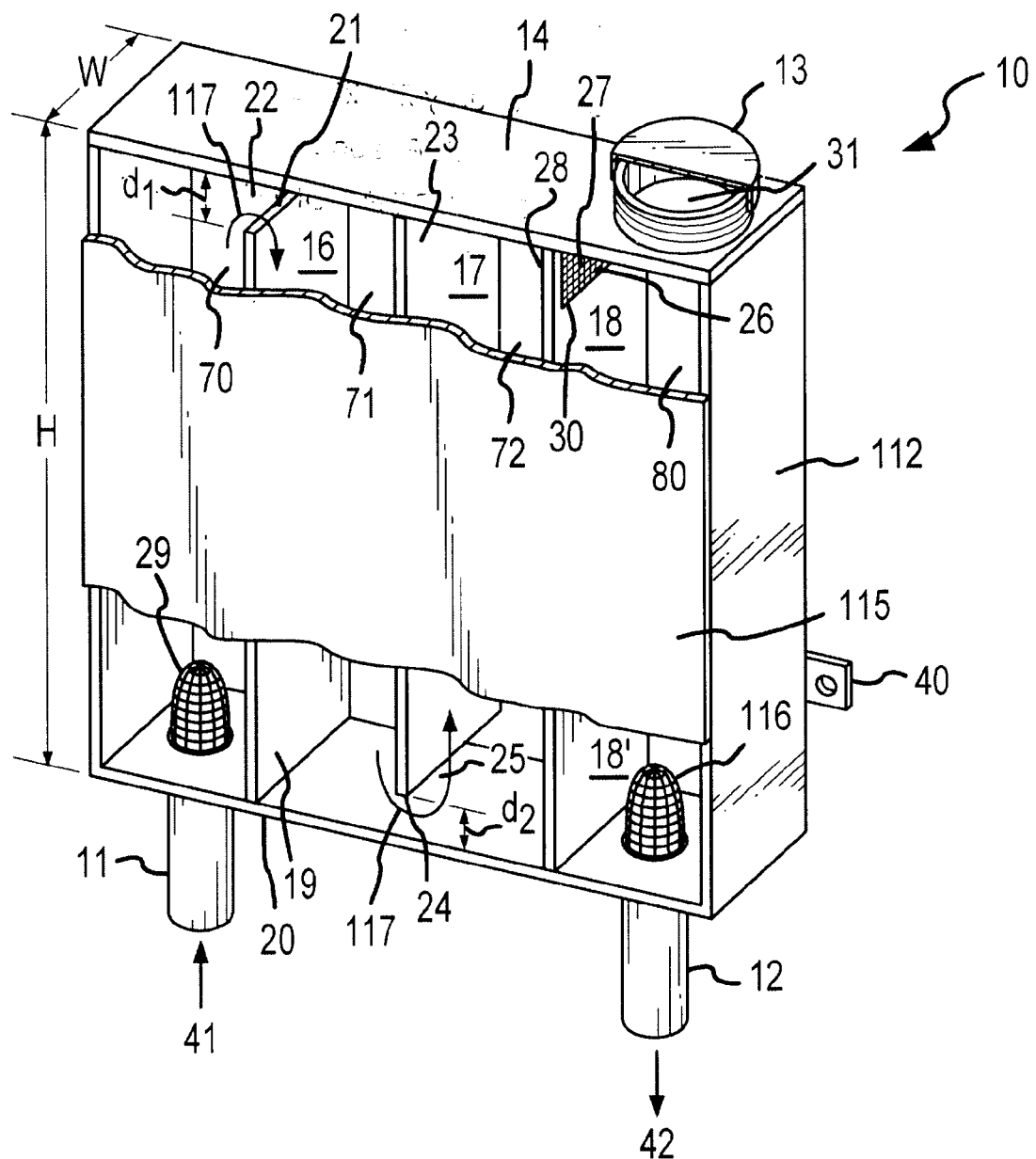
FIG. 2 is an isometric view of an embodiment of the water conditioning apparatus that shows internal details.

Turning now to FIG. 2, a cutaway view of the water conditioning apparatus 10 according to an embodiment of the invention is shown. The internal volume of the water conditioner 10 is subdivided into internal chambers 70, 71, 72 and 80 having substantially a height H by internal dividers 16, 17 and 18 that extend across the width W of the apparatus 10 to sealably abut the side walls 112 and 115. The internal chambers 70, 71 and, 72 are at least partially filled with a water conditioning material, preferably cation exchange resin beads. The internal chamber 80 does not contain the water softening beads. Internal divider 16 sealably abuts the bottom wall 20 and extends upwardly toward the top wall 14 to form a top edge 21 spaced apart from the top wall 14 by a distance $d_1$ to establish a first flow gap 22. Internal divider 17 sealably abuts the top wall 14 and extends downwardly towards the bottom wall 20 to form a bottom edge 24 spaced apart from the bottom wall 20 by a distance $d_2$ to establish a second flow gap 25. Internal divider 18 sealably abuts the top wall 14 and extends downwardly towards the bottom wall 20 to sealably abut the bottom wall 20. Internal divider 18 is further comprised of a fine screen 26 located in a top aperture 30 that projects through the divider 18. The screen 26 prevents the passage of resin beads into the chamber 80. The apparatus 10 may be fabricated from conventional materials, such as stainless steel, aluminum, or various polymers, but preferably is fabricated by an investment die casting technique that uses a foam material to form the internal spaces of the container. During this process, the foam investment material is consumed. Use of this technique in fabrication will allow significant cost reductions to occur when compared to other possible fabrication techniques.

Still referring to FIG. 2, chamber 70 is further comprised of a sieve 29 positioned on the inlet pipe 11. Similarly, chamber 80 is further comprised of a sieve 116 positioned at the outlet pipe 12. Preferably, the sieve 29 is fabricated from a woven wire material having a mesh size small enough to preclude the passage of water softening resin beads through the sieve 29. Similarly, the mesh filter 116 is preferably fabricated from a woven wire material having a mesh size at least sufficient to exclude the passage of salt crystals that are commonly used in water softening devices.

During normal operation of the water conditioner apparatus 10, domestic water 41 enters the apparatus though an inlet pipe 11 and flows through the apparatus 10 in a labyrinth course through internal chambers 70, 71, 72 and 80 in a normal flow direction 117 and exits the unit through an outlet pipe 12 as conditioned water 42. Fluid communication between internal chambers 70, 71, 72 and 80 is accomplished through openings 22, 24 and 26. For purposes of this description, domestic water generally refers to mineral laden water obtained from a source such as a municipal water system, or from a water well. Conditioned water refers to domestic water that has been subjected to treatment sufficient to reduce the concentration of undesirable minerals in the domestic water to an acceptable level. Water is conditioned in the water conditioner apparatus 10 through exposure to a bed of cation exchange resin beads that substantially occupy internal chambers 70, 71 and 72. For clarity of illustration, the resin beads in the chambers 70, 71 and 72 are not shown. When the exchange capability of the resin beads has been substantially depleted, the resin beads are generally restored to their initial state through exposure to a sodium chloride solution. Accordingly, chamber 80 does not contain resin beads and serves as a receiver for the introduction of sodium chloride in crystalline form into the water conditioner 10. By continuously flushing the sodium chloride solution through the water conditioner apparatus 10 in a flow direction opposite to that of the normal flow direction 117, the resin beads may be substantially restored to their initial state. As described above, to retain the resin beads within the water conditioning apparatus 10, a sieve 29 is provided at the water inlet 11, to prevent resin beads from migrating out of the apparatus 10. Similarly, a screen 26 is placed in internal divider 18 to prevent migration of resin beads into chamber 80. The sieve 29 and the screen 26 also prevent resin bead migration during the recharging cycle. The mesh size of the sieve 29 and the screen 26 is determined by the size of the resin beads employed in the apparatus.

The inclusion of the internal chamber 80 in the apparatus 10 thus advantageously allows this important recharging function to be accomplished in situ, so that removal of the apparatus 10 from the installation location is not required.

The dimensions of the internal chambers 70, 71, 72 and 80 may be advantageously tailored to meet a specific water conditioning requirement. For example, alteration of the physical dimensions H and W, as shown in FIG. 2, will allow the water 41 undergoing treatment to have a greater residence time in the cation exchange resin bed. Since the undesirable mineral content in domestic water is relatively constant in a particular geographical location, it is envisioned that the dimensions H and W may be advantageously adjusted for water conditioning applications in specific areas. Alternatively, dimensions H and W may also be varied to meet particular space requirements. Similarly, the first flow gap 22 and second flow gap 25 may be changed by altering the dimensions $d_1$ and $d_2$ respectively to advantageously achieve a desired fluid flow rate or water conditioning requirement.

Although the water conditioning apparatus 10 is subdivided into four chambers, as shown in FIG. 2, with chambers 70, 71 and 72 filled with cation exchange resin beads, chamber 80 contains no resin beads, and is used as a salt solution tank for recharging the unit. During recharging, opening 31 provides a means for introducing the crystalline salt into the unit. A cap 13 provides a pressure tight closure for the opening 31. Domestic water is introduced into the apparatus 10 through outlet pipe 12, forming the recharging solution in the salt solution tank. During recharging, the fluid motion through the apparatus is in the opposite direction to that shown by 25, so that the salt solution is transported back through the cation exchange resin beads.

Although the water conditioning apparatus 10 as depicted in FIG. 2 has four internal chambers, it is understood that alternative embodiments of the invention may utilize a plurality of resin containing chambers, depending on the water conditioning requirement. Moreover, other chambers may be added that contain other water conditioning substances. For example, an alternative embodiment may contain at least one chamber containing activated carbon, or other substances capable of removing undesired properties. However, it is understood that at least one of the internal chambers in the apparatus 10 must be used for mixing and containing a salt solution for recharging Consequently, it cannot be filled with cation exchange resin beads.

Figures 3A, 3B:
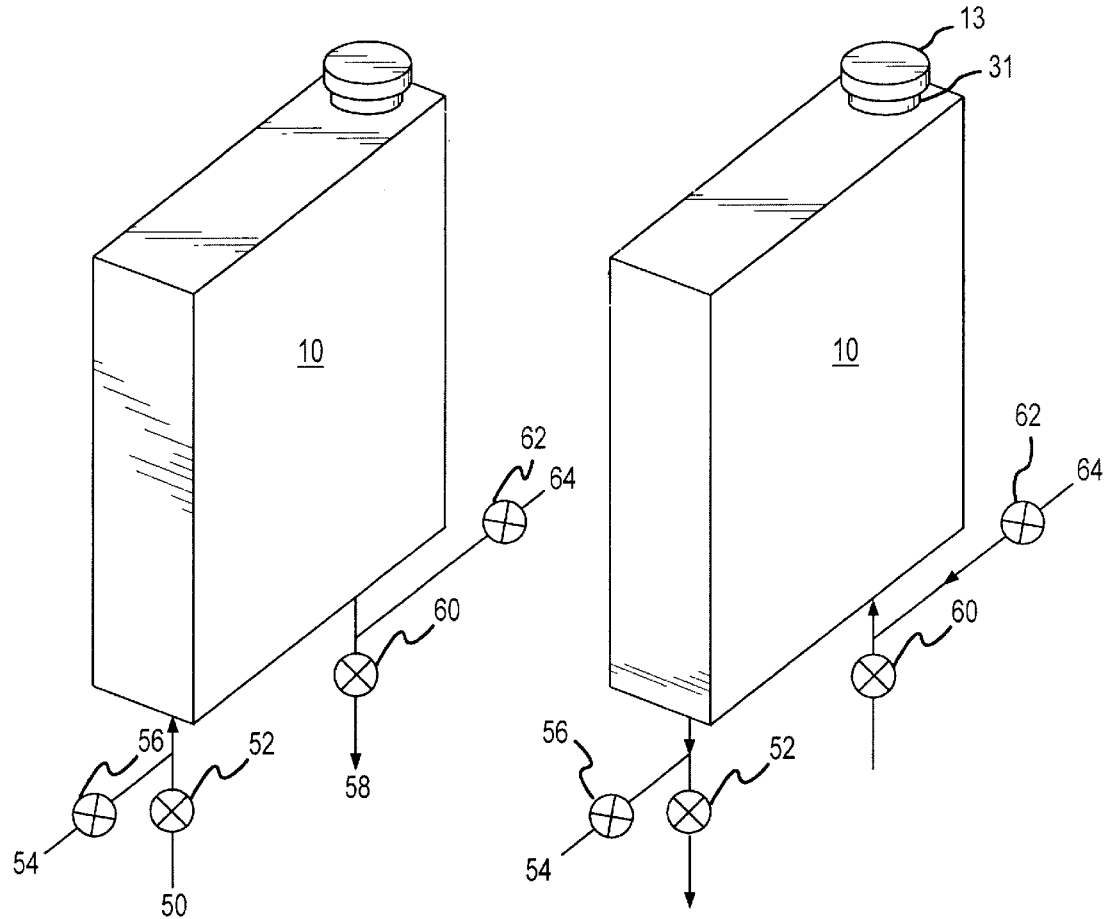
FIG. 3(a) is an isometric view of an embodiment of the water conditioning apparatus that shows a schematic representation of plumbing details.
FIG. 3(b) is an isometric view of an embodiment of the water conditioning apparatus that shows a schematic representation of plumbing details.

As previously noted, a principal advantage of the present invention is the ability to recharge the water conditioning apparatus without removing the apparatus from its installation position. FIGS. 3(a) and 3(b) show the water conditioning apparatus 10 with a schematic view of the plumbing connections necessary to achieve both normal and backflushing operations. Two main water lines 50 and 58 are used, with two additional lines 54 and 64 branching therefrom, as shown. Valves 52, 56, 60 and 62 are required to control fluid flows in lines 50, 58, 54 and 64.

FIG. 3(a) shows the water conditioning apparatus 10 configured for normal operation. Accordingly, domestic water enters line 50 and passes through valve 52, which is open. Valve 56 is closed, preventing water from escaping into waste line 54. Conditioned water leaves the unit 85 through line 58 and valve 60, which is in the open position. Line 64 is connected to a supply of domestic water for backflushing operation. During normal operation, valve 62 is fully closed.

When the cation absorption capacity of the resin beads within the water conditioning apparatus has been exhausted, recharging is required, as previously described. The water conditioning apparatus 10 shown in FIG. 3(b) is configured for the recharging operation. Subsequent to the introduction of a measured amount of a crystalline salt into the salt solution tank through opening 31, cap 13 is replaced, and valves 52 and 60 are closed. Domestic water is introduced into the brine tank through line 64 when valve 62 is in the open position. The domestic water thus introduced forms a salt solution with the salt that is carried into the cation exchange resin beds. Excess salt solution is discarded through waste line 54 when valve 56 is open. The valves and delivery lines shown in FIGS. 3(a) and 3(b) may consist of discrete valves and delivery lines, or, preferably may be comprised of multi-position or "ganged" valves whereby a single setting on the valve handle achieves either the valve setting shown in FIG. 3(a) or in FIG. 3(b) through a single valve position setting. An example of such a multi function valve is Model No. 200C-N Panel Mount Ball Valve manufactured by the Anderson Brass Company. The amount of salt required for the backflushing operation is typically predetermined by calculation. As an alternative, however, a brine metering system with a programmable timer could be employed to implement the recharging process automatically.

Figure 4:
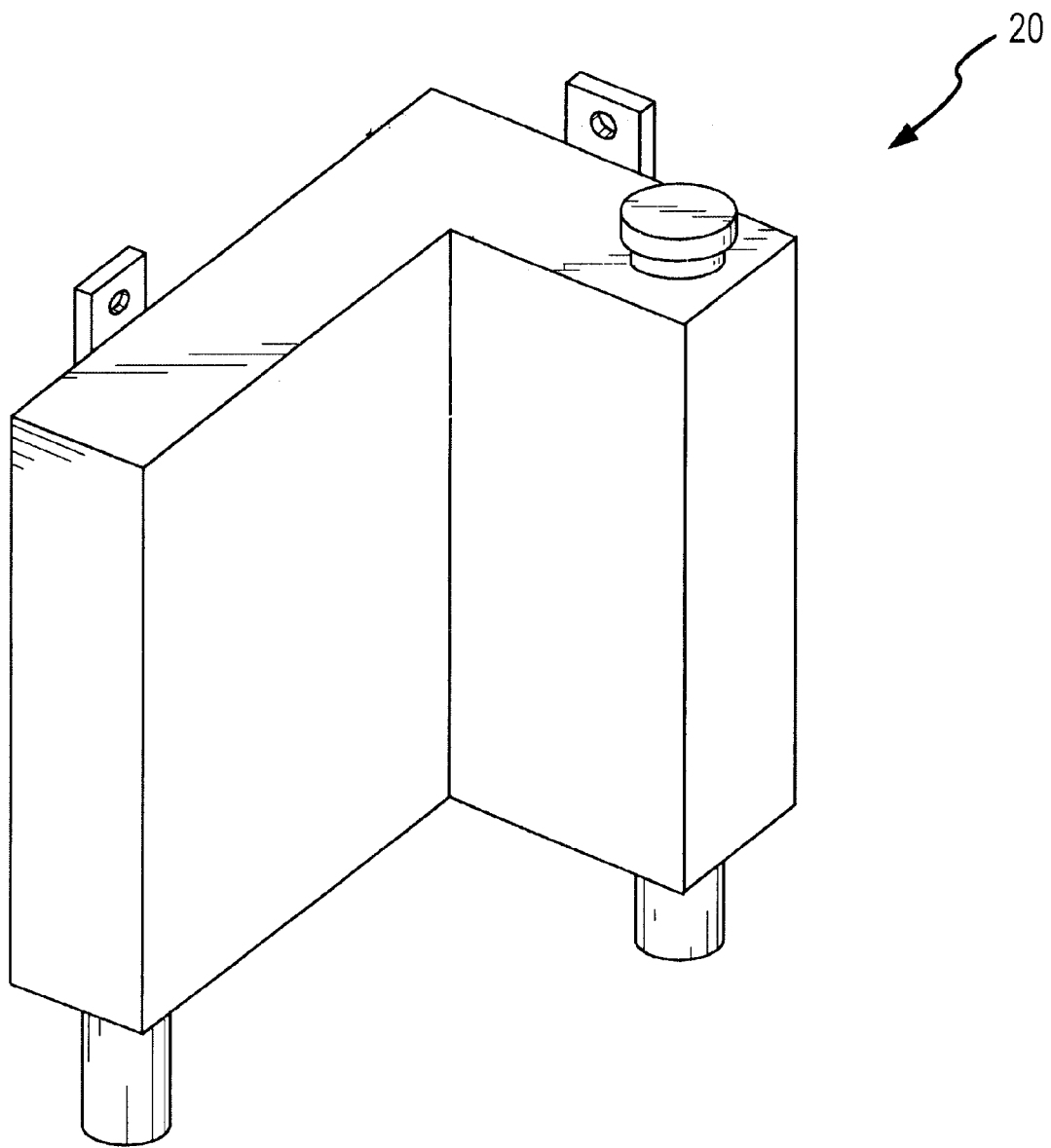
FIG. 4 is a schematic representation of an alternative embodiment of the water conditioning apparatus.

FIG. 4 is an isometric view of an alternative embodiment according to the invention. The water conditioning apparatus 20 shown therein is configured to fit in a corner space. Since it is recognized that significant space limitations presently exist in food service establishments, this embodiment may find particular utility.

Figure 5:
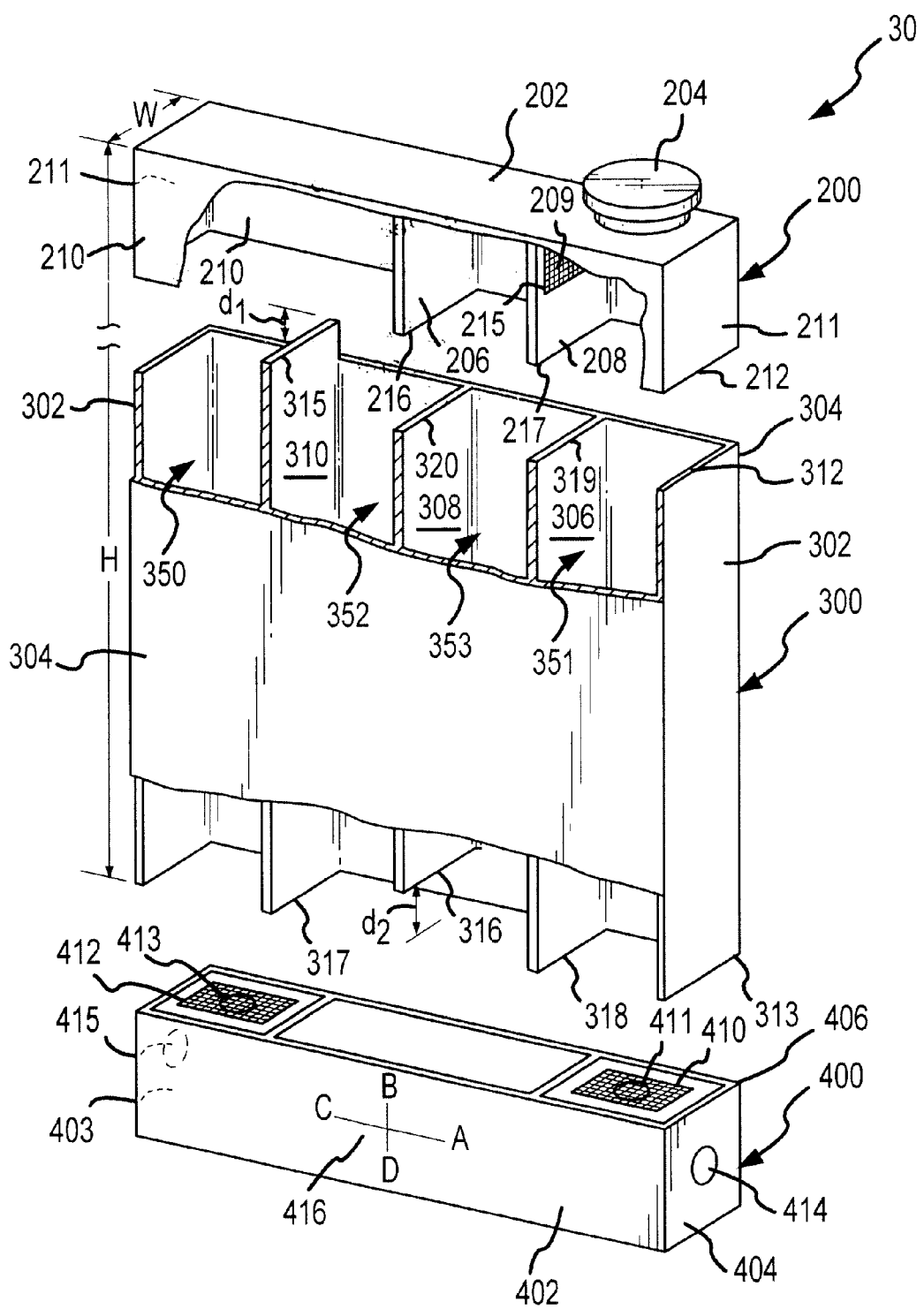
FIG. 5 is an isometric exploded view of still another embodiment of the water conditioning apparatus.

FIG. 5 is an isometric, exploded view of still another alternative embodiment according to the invention. The water conditioning apparatus 30 as shown therein is of modular design, and is comprised of a removable top portion 200, a middle channeled portion 300, and a removable bottom portion 400. The top portion 200 has a top wall 202, and a pair of opposing side walls 210 that are joined to a pair of end walls 211. The top wall includes a resealable opening 204, and further has an opposing peripheral sealing surface 212 that extends around the lower periphery of the top portion 200. The top portion also has internal dividers 206 and 208 that extend between the opposing side walls 210. The internal divider 206 extends downwardly from the top wall 202 to form a lower edge 216. Similarly, internal divider 208 extends downwardly to form a lower edge 217. The internal divider 208 further has an aperture 215 that projects through the internal divider 208 and has a sieve 209 mounted therein.

Still referring to FIG. 5, the middle channeled portion 300 is comprised of a pair of opposing side walls 304 joined to a pair of end walls 302. The middle channeled portion 300 further includes an upper peripheral sealing surface 312 disposed on an upper edge of the middle channeled portion 300, and a lower sealing surface 313 disposed on a lower edge of the middle channeled portion 300. The side walls 304 and end walls 302 enclose the internal dividers 306, 308 and 310 that extend between the side walls 304. The internal divider 310 further projects upwardly from a lower edge 317 to form a top edge 315 that is located a distanced $d_1$ above the upper sealing surface 312. The internal divider 308 projects downwardly from an upper end 320 to form a lower edge 316 that is located a distanced $d_2$ above lower sealing surface 313. The internal divider 306 extends from an upper edge 319 downwardly to a lower edge 318. The arrangement of internal dividers 306, 308 and 310 form internal chambers 350, 351, 352 and 353 in the middle channeled portion 30. Chambers 350, 352 and 353 are adapted to receive resin beads. Chamber 351 serves as a salt receiving tank, as in previous embodiments.

A bottom portion 400 is comprised of a top surface 405, a front wall 402, a first side wall 403 and a second side wall 404 opposite the first side wall 403. The top surface 405 further includes a peripheral mating surface 406 and internal mating surfaces 407 and 408. Projecting through the top surface 405 of the bottom portion 400 is an inlet port 413. A filtration sieve 412 preferably covers the inlet port 413. The top surface 405 also includes an outlet port 411 that is also preferentially covered by a filtration sieve 410. The front wall 402 further includes a selector valve 416 that controls the routing of fluids within the bottom portion 400. The internal details of the bottom portion 400 will be described in detail later. The first side wall 403 includes a discharge port 415 adapted to fluidly connect to a wastewater disposal system. The second side wall 404 includes a conditioned water supply port 414 that is adapted to fluidly connect to a conditioned water consumer.

With reference still to FIG. 5, the water conditioning apparatus 30 is assembled by sealably joining the peripheral sealing surface 212 on the top portion 200 to the upper peripheral sealing surface 312 on the middle channeled portion 300. During this assembly step, the lower edges 216 and 217 of the top portion 200 are joined to upper edges 319 and 320 on the middle channeled portion 300. Assembly of the apparatus 30 further includes sealably joining the peripheral mating surface 406 on the bottom portion 400 to the lower sealing surface 313 on the middle channeled portion 300. When the middle channeled portion 300 is joined to the bottom portion 400 in this manner, internal mating surfaces 407 and 408 on the top surface 405 of bottom portion 400 sealably join with lower edges 317 and 318 on the middle channeled portion 300.

The apparatus 30 thus assembled has a height H, and a width W that may be advantageously adjusted for water conditioning applications in specific areas. Further, the dimensions H and W may also be adjusted to meet specific space requirements. Similarly, the internal dimensions $d_1$ and $d_2$ may be adjusted to meet flow requirements. The top portion 200, middle channeled portion 300 and bottom portion 400 may be joined by conventional fastening means to form a pressure tight assembly. As an example, through bolts that project through the bottom portion 400, into and through the middle channeled portion 300, and threadably connect to the top portion 200 may be used. Alternatively, the top portion 200, middle channeled portion 300 and bottom portion 400 may be joined by a suitable adhesive such as an epoxy resin. In addition, the peripheral sealing surfaces 312 and 313 in the middle channeled portion 300 may further include resilient o-rings disposed within retaining grooves (not shown) to sealably join the top portion 200 and bottom portion 400 to the middle channeled portion 300. Additionally, resilient gaskets may also be used.

Figure 6:
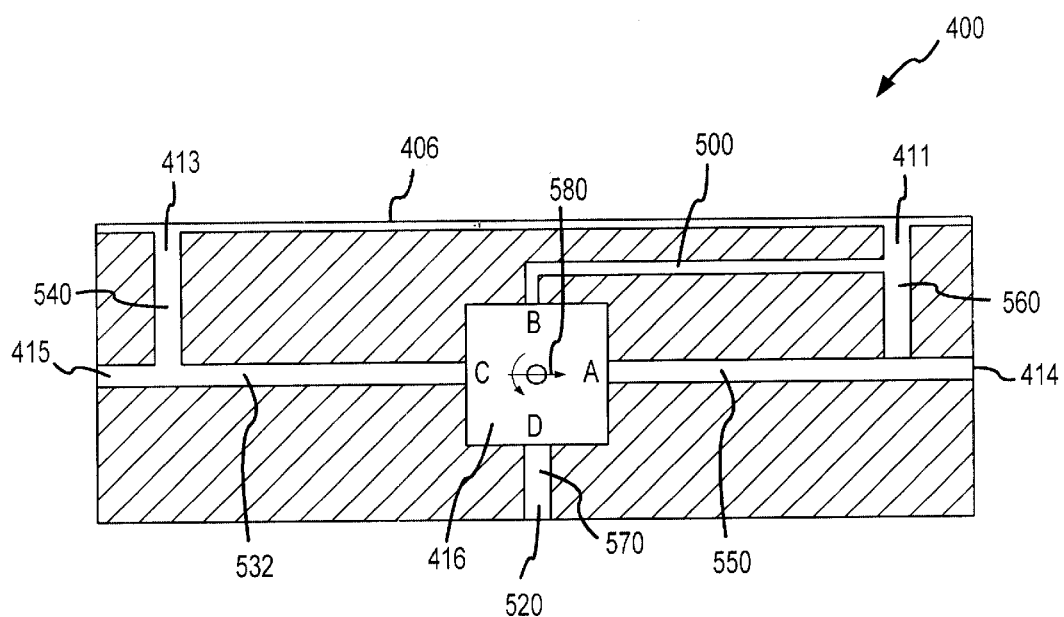
FIG. 6 is a frontal cross sectional view of the lower portion showing inner details of still another embodiment of the invention.

Turning now to FIG. 6, the internal details of the bottom portion 400 will now be described in detail. As shown therein, the bottom portion is further comprised of a selector valve 416 with a frontally positioned selector handle 580. The selector valve 416 is capable of selecting one of four positions A, B, C and D, as shown, which correspond to ports A, B, C and D, when the selector handle 580 is rotated. The selector valve 416 is structured to fluidly connect ports A, B or C to port D when the selector handle 580 is moved to the position corresponding to that port. For example, when position A is selected, port D is fluidly connected to port A. When position B is selected, port D is fluidly connected to port B, etc. When position D is selected, the selector valve is not fluidly connected to any other port, and is therefore "off". An example of such a selector valve is the Model No. 200C-N Panel Mount Ball Valve manufactured by the Anderson Brass Company. The bottom portion 400 also includes an internal passage 550 that is fluidly connected to port A on valve 416 and extends to discharge port 414. The internal passage 55 also connects to internal passage 560 and extends to outlet port 411. Internal passage 500 is fluidly connected to port B on the valve 416, and further includes a flow restriction. Preferably, this flow restriction is comprised of a fluid passage with a small internal diameter. The passage 500 also fluidly connects with internal passage 560. A further internal passage 530 extends from port C on the valve 416 to the discharge port 415, and is further fluidly connected to an internal passage 540 that extends to inlet port 413. An additional internal passage 570 is fluidly connected to port D on the selector valve and extends to a water inlet port 520.

With reference to FIGS. 5 and 6, the operation of the apparatus 30 will now be described. With water inlet port 520 fluidly connected to a source of unconditioned water (not shown), and the selector valve 416 positioned at C, unconditioned water is directed from water inlet port 520 to port 413, thus entering the first chamber 350 (shown in FIG. 5), and subsequently moving to other chambers in the apparatus 30. Conditioned water then exits the chamber 351 (also shown in FIG. 5) through port 411 to emerge from the apparatus 30 through discharge port 414, to be directed to a conditioned water consumer. When regeneration of the apparatus 30 is required, the chamber 351 is loaded with the appropriate amount of salt through the resealable opening 204. Valve 416 is then moved to the B position, thus allowing a metered flow of water to enter the chamber 351 and dissolve the crystalline salt solution deposited therein. After the salt has substantially dissolved in the water, the valve 416 may be moved to the A position to flush the salt solution through the resin beads (not shown) located in chambers 350, 352 and 353. The flushing is continued until substantially all of the salt solution is flushed from the apparatus 30. Returning the selector valve 416 to the C position will restore the apparatus to its normal water conditioning function.

The above description is considered to be that of the preferred embodiments only. Modification of the disclosed invention will occur to those skilled in the art and to those who make and use the invention. Therefore, it is understood that the embodiments shown in the drawings and described above are merely for illustrative purposes and are not intended to limit the scope of the invention.

What is claimed is:

1. A user rechargeable water conditioning apparatus for processing a continuous flow of water, comprising:

an enclosed housing having an internal volume adapted to sealably contain a fluid, the internal volume being further divided into a plurality of internal compartments, each having substantially parallel walls and a compartment volume, each compartment being serially fluidly connected to form a serially connected and continuous flow path through the apparatus that proceeds from a fluid inlet that is fluidly connected to an inlet compartment, through a plurality of intermediate compartments to a fluid outlet that is fluidly connected to an outlet compartment, the flow path in each of the compartments being substantially parallel to the internal dividers;

a resealable opening positioned on the outlet compartment that is structured to allow a recharging material to be deposited into the outlet compartment;

a selector valve that is structured to selectively allow the flow of water into the housing to be reversed; and a water conditioning material disposed within the inlet compartment and the intermediate compartments that at least partially fills the compartment volumes.

2. The apparatus according to claim 1 wherein the number of internal compartments is at least about four.

3. The apparatus according to claim 1 wherein the water conditioning material is comprised of cation-exchange resin beads capable of being recharged.

4. The apparatus according to claim 1 wherein the outlet compartment is further comprised of an aperture with a screen disposed within the aperture, the screen having a mesh size sufficient to prevent the passage of resin beads from the inlet and intermediate compartments into the outlet chamber.

5. The apparatus according to claim 1 wherein the fluid inlet is further comprised of a sieve positioned on the inlet, the sieve having a mesh size sufficient to prevent the passage of the water conditioning material through the inlet.

6. The apparatus according to claim 1 wherein the fluid outlet is further comprised of a sieve positioned on the outlet, the sieve having a mesh size sufficient to prevent the passage of the recharging material through the outlet.

7. The apparatus according to claim 1 wherein the recharging material is comprised of sodium chloride.

8. The apparatus according to claim 1 wherein the resealable opening is further comprised of a fluid tight cap.

9. The apparatus according to claim 1 wherein the water conditioning material disposed within the inlet compartment and the intermediate compartments substantially fills the compartment volumes.

10. The apparatus according to claim 1 wherein at least one of the inlet compartment and the intermediate compartments is at least partially filled with a water purification material.

11. The apparatus according to claim 10 wherein the water purification material is further comprised of an activated carbon material.

12. The apparatus according to claim 1 wherein the selector valve is further comprised of a valve with an inlet port that is connected to a source of unconditioned water and structured to direct the unconditioned water to either the inlet compartment, or the outlet compartment.

13. The apparatus according to claim 12 wherein the selector valve directs the water into the outlet compartment during a recharging operation, and into the inlet compartment during the water conditioning operation.

14. The apparatus according to claim 13 wherein the selector valve further directs a metered flow of unconditioned water into the outlet tank after the recharging material has been deposited therein to form a solution capable of recharging the conditioning material contained within the inlet and intermediate compartments.

15. A water conditioning apparatus, comprising:
a first enclosed chamber with a first internal volume that is structured to sealably contain a fluid;
a second enclosed chamber with a second internal volume that is structured to sealably contain a fluid, the second chamber being in fluid communication with the first chamber through a fluid interconnection having an aperture with a screen disposed within the aperture, the screen having a mesh size sufficient to prevent the passage of resin beads through the aperture;
a fluid inlet sealably attached to the first chamber and in fluid communication with the first chamber;
a fluid outlet sealably attached to the second chamber and in fluid communication with the second chamber;
a resealable opening disposed on the second chamber and structured to allow a recharging material to be deposited into the second chamber; and
a water conditioning material disposed within the first internal volume of the first chamber that at least partially fills the first internal volume.

16. A water conditioning apparatus, comprising:
a first enclosed chamber with a first internal volume that is structured to sealably contain a fluid;
a second enclosed chamber with a second internal volume that is structured to sealably contain a fluid, the second chamber being in fluid communication with the first chamber through a fluid interconnection;
a fluid inlet sealably attached to the first chamber and in fluid communication with the first chamber, the fluid inlet including a sieve positioned on the inlet, the sieve having a mesh size sufficient to prevent the passage of the water conditioning material through the inlet;
a fluid outlet sealably attached to the second chamber and in fluid communication with the second chamber;
a resealable opening disposed on the second chamber and structured to allow a recharging material to be deposited into the second chamber; and
a water conditioning material disposed within the first internal volume of the first chamber that at least partially fills the first internal volume.

17. A water conditioning apparatus, comprising:
a first enclosed chamber with a first internal volume that is structured to sealably contain a fluid; a second enclosed chamber with a second internal volume that is structured to sealably contain a fluid, the second chamber being in fluid communication with the first chamber through a fluid interconnection;
a fluid inlet sealably attached to the first chamber and in fluid communication with the first chamber;
a fluid outlet sealably attached to the second chamber and in fluid communication with the second chamber, the fluid outlet including a sieve positioned on the outlet, the sieve having a mesh size sufficient to prevent the passage of the recharging material through the outlet;
a resealable opening disposed on the second chamber and structured to allow a recharging material to be deposited into the second chamber; and
a water conditioning material disposed within the first internal volume of the first chamber that at least partially fills the first internal volume.

18. A water conditioning apparatus for processing a continuous flow of water, comprising:
an enclosed housing having an internal volume adapted to sealably contain a fluid, the internal volume being further divided into a plurality of internal compartments, each having substantially parallel walls and a compartment volume, each compartment being serially fluidly connected to form a serially connected and continuous flow path through the apparatus that proceeds from a fluid inlet that is fluidly connected to an inlet compartment, through a plurality of intermediate compartments to a fluid outlet that is fluidly connected to an outlet compartment, the flow path in each of the compartments being substantially parallel to the internal dividers, the outlet compartment further including an aperture with a screen disposed within the aperture, the screen having a mesh size sufficient to prevent the passage of resin beads from the inlet and intermediate compartments into the outlet chamber;
a resealable opening positioned on the outlet compartment that is structured to allow a recharging material to be deposited into the outlet compartment; and
a water conditioning material disposed within the inlet compartment and the intermediate compartments that at least partially fills the compartment volumes.

19. A water conditioning apparatus for processing a continuous flow of water, comprising:
an enclosed housing having an internal volume adapted to sealably contain a fluid, the internal volume being further divided into a plurality of internal compartments, each having substantially parallel walls and a compartment volume, each compartment being serially fluidly connected to form a serially connected and continuous flow path through the apparatus that proceeds from a fluid inlet that is fluidly connected to an inlet compartment, through a plurality of intermediate compartments to a fluid outlet that is fluidly connected to an outlet compartment, the flow path in each of the compartments being substantially parallel to the internal dividers, the fluid inlet further including a sieve positioned on the inlet, the sieve having a mesh size sufficient to prevent the passage of the water conditioning material through the inlet;

a resealable opening positioned on the outlet compartment that is structured to allow a recharging material to be deposited into the outlet compartment; and a water conditioning material disposed within the inlet compartment and the intermediate compartments that at least partially fills the compartment volumes.

20. A water conditioning apparatus for processing a continuous flow of water, comprising:

an enclosed housing having an internal volume adapted to sealably contain a fluid, the internal volume being further divided into a plurality of internal compartments, each having substantially parallel walls and a compartment volume, each compartment being serially fluidly connected to form a serially connected and continuous flow path through the apparatus that proceeds from a fluid inlet that is fluidly connected to an inlet compartment, through a plurality of intermediate compartments to a fluid outlet that is fluidly connected to an outlet compartment, the flow path in each of the compartments being substantially parallel to the internal dividers, the fluid outlet further including a sieve positioned on the outlet, the sieve having a mesh size sufficient to prevent the passage of the recharging material through the outlet;

a resealable opening positioned on the outlet compartment that is structured to allow a recharging material to be deposited into the outlet compartment; and a water conditioning material disposed within the inlet compartment and the intermediate compartments that at least partially fills the compartment volumes.

* * * * *